May 23, 1939.  D. H. MONTGOMERY ET AL  2,159,398
STOP MECHANISM FOR BAR MACHINES
Original Filed Oct. 25, 1935   3 Sheets-Sheet 2
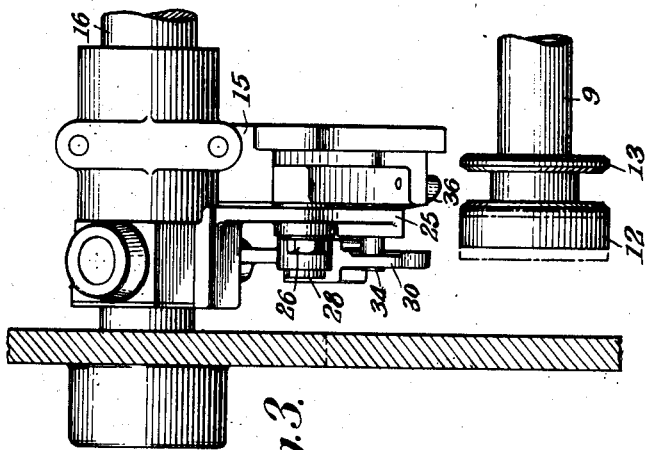
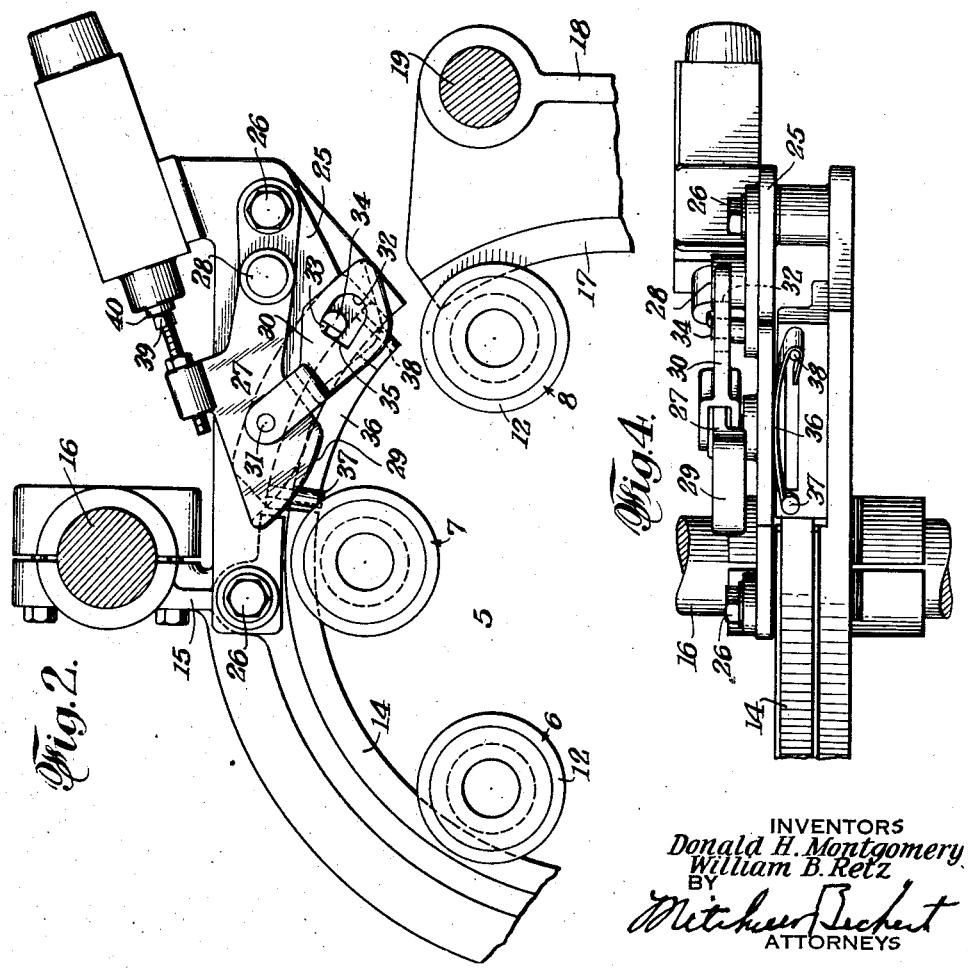
INVENTORS
Donald H. Montgomery
William B. Retz
BY
ATTORNEYS May 23, 1939.　　D. H. MONTGOMERY ET AL　　2,159,398
STOP MECHANISM FOR BAR MACHINES
Original Filed Oct. 25, 1935　　3 Sheets-Sheet 3

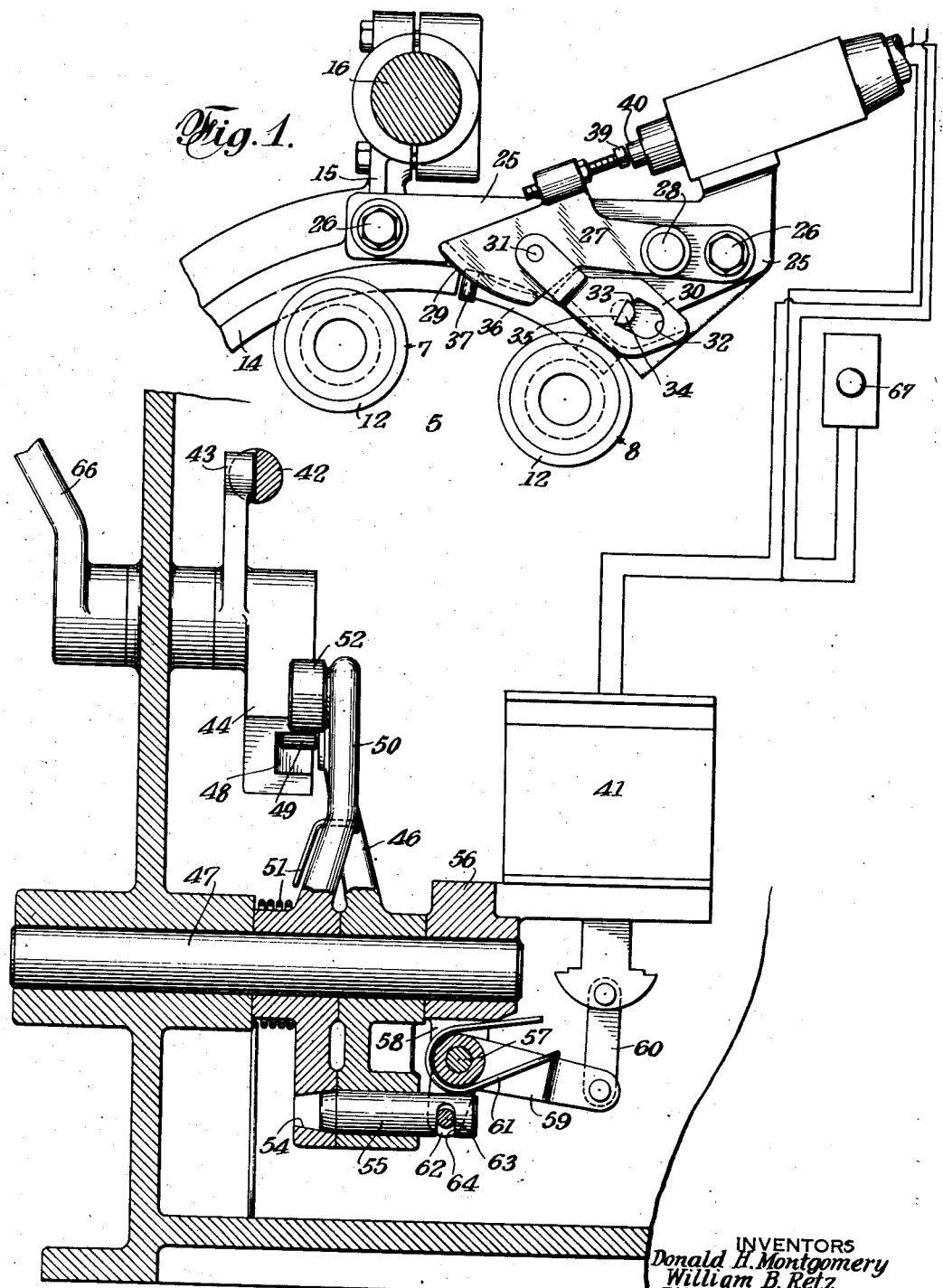

INVENTORS
Donald H. Montgomery
William B. Retz
BY
ATTORNEYS

Patented May 23, 1939

2,159,398

UNITED STATES PATENT OFFICE 2,159,398

STOP MECHANISM FOR BAR MACHINES

Donald H. Montgomery, West Hartford, and William B. Retz, Plainville, Conn., assignors, by mesne assignments, to The New Britain Machine Company, New Britain, Conn., a corporation of Connecticut Application October 25, 1935, Serial No. 46,662
Renewed April 13, 1938

31 Claims. (Cl. 29—37)

Our invention relates to an automatic stop mechanism for a screw machine, particularly a multiple spindle indexing type bar machine.

In a bar machine the bar of stock is usually automatically fed out against a stock stop and, while being so held by the feed slide, the bar is chucked in a spring or collet chuck, after which the feed tube is withdrawn, and, if a multiple spindle machine, the spindle carrier is indexed to bring the fed end of the stock into the first work station. When the bar of stock has been fed out and cut off a sufficient number of times, the rear end is drawn into and concealed within the feed tube and the operator must ordinarily estimate how many additional piece parts may be made from the stock remaining in the spindle before the spindle must be restocked with a fresh bar. If the bar be fed short as when it is exhausted, there is great likelihood of serious damage to end working or forming tools, or both, and even though there be no damage to the tools, the piece part made from a short fed length of stock would ordinarily be useless and the time of the machine consumed in making the useless piece is wasted. On the other hand, if the machine be stopped and the butt end of stock removed before it becomes necessary to renew the bar, considerable material is wasted in such long butts.

It is the principal object of our invention to provide an improved mechanism for stopping the machine when the stock in any spindle has become exhausted.

It is a more specific object to provide means for stopping a machine upon a run-out of stock so arranged that a control mechanism is automatically reset after the spindle has been restocked and the machine again started.

It is a further object to provide an improved mechanism for automatically stopping a bar machine upon a run-out of stock after the last piece part has been severed from the bar and the chuck opened.

Other objects and various features of invention will be hereinafter pointed out or will become apparent to one skilled in the art.

Briefly stated, in a preferred form of the invention as applied to a multiple spindle bar machine, for example as set forth in Gridley et al. application, Serial No. 551,136, filed July 16, 1931, each spindle is provided with a feed tube having feed fingers thereon for gripping and feeding the stock. After the feed out of stock, the stock is gripped in a chuck, after which the feed tube is withdrawn, usually by a cam, the feed fingers sliding frictionally over the stock. So long as the feed tube in its retracted position frictionally engages the stock, the latter will be fed at the proper time a sufficient distance to make a piece part of proper length. However, when the butt end of stock has been reduced to such length that the feed fingers slip off of the butt end of the stock, there is, in most cases, assurance that the stock will not be fed forward a sufficient distance to bring the front end of the stock up against the stock stop and, when the butt end has been so reduced in length, that spindle should be restocked. We preferably take advantage of the relative freedom of movement of the feed tube after the feed fingers have been disengaged from the butt end of the stock to move the feed tube to an abnormal position and, when so moved, to cause the same to operate mechanism, such as a control means for stopping or initiating the stopping of the machine. Such control means in the preferred form is actuated by the feed tube moved to an abnormal position during an indexing movement of the spindle carrier. We preferably provide, in addition, mechanism controlled by the control mechanism for stopping the machine but not until the spindle carrier has completed its indexing movement and preferably not until the piece part on the exhausted butt end of stock has been severed, that is, when such piece parts are severed in the feeding station of the machine. In other words, upon an indexing movement the control mechanism is actuated, but delayed action mechanism, controlled by the control mechanism, later serves to stop the machine at the desired point in the cycle, such point preferably being after the last piece part has been cut off, the chuck opened, and the feed tube moved forward so as to project the butt end through the spindle where it may be readily grasped and removed preparatory to restocking the spindle with a new bar of stock.

In the drawings which show, for illustrative purposes only, a preferred form of the invention as applied to a bar machine of the type disclosed in said Gridley et al. application, Serial No. 551,136, filed July 16, 1931—

Fig. 1 is a fragmentary end view of a spindle carrier showing two spindles and illustrating control and machine stopping mechanism;

Fig. 2 is a fragmentary view similar to the upper part of Fig. 1 but illustrating parts in a different position and further illustrating one feed tube in engagement with a stock feeding slide;

Fig. 3 is a view of parts shown in Fig. 2 as viewed from the right and omitting the feed slide;

Fig. 4 is a bottom plan view of parts shown in Fig. 2;

Figure 6:
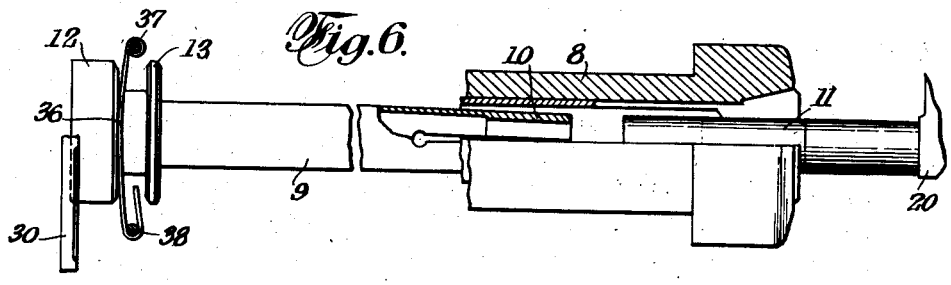
Fig. 6 shows conventionally a spindle and feed tube, together with part of our improved control mechanism.

As is more fully set forth in said Gridley et al. application, the bar machine includes a frame supporting a spindle carrier 5 having a plurality of spindles 6—7—8, the number of spindles being in general immaterial. The indexible spindle carrier 5 is indexed so as to successively bring the spindles into the feeding station, the spindle 8 in Fig. 2 being indicated in such feeding station. These spindles are rotated as by means of a central gear as is common in this art. Each spindle has a feed tube 9 having spring feed fingers 10 at the forward end to normally frictionally grip a bar of stock, the butt end of such a bar being indicated at 11 in Fig. 6. Each feed tube, furthermore, carries, or has formed thereon, a feed spool comprising spaced apart flanges 12—13. In multiple spindle bar machines, generally, the feed tubes, after feeding the stock forward and after the same has been gripped by the chucks, are withdrawn by a cam and the frictional hold of the feed fingers on the stock is sufficient to maintain the feed tubes in definite retracted position. However, as set forth in said Gridley et al. application, we preferably provide a guard ring 14 supported on a suitable bracket 15 on bars, one of which is indicated at 16, carried by a part of the machine frame. The guard ring 15 preferably extends sufficiently so as to fit within the spool of each feed tube when in all stations other than the feed station. The guard ring 14 thus serves to definitely hold all of the feed tubes in work stations in definite longitudinal position and to deliver the same upon an indexing movement to the feed shoe 17 on the feed slide 18 which may be slidably mounted as upon rods 19 carried by the machine frame. The guard ring 14 is adjustable longitudinally of its supporting bars 16 so as to cause it to register with the feed shoe 17 when the latter is in retracted position, that is, just before the feed tube in engagement therewith is indexed to the first work station.

The normal operation of a bar machine, as disclosed, of course involves tooling operations in all of the work stations and frequently severing or a first operation in feeding station, and each spindle finally arrives at the work station indicated as the spindle 7 in Fig. 2. From the station of spindle 7 in Fig. 2, each spindle is indexed clockwise into the severing and feed station indicated as the station spindle 8 in Fig. 2. After the spool of the feeding tube leaves the guard ring 14, it engages the feed shoe 17 which, after the chuck of the spindle in feed station has been opened, is fed forward preferably by means of a spring, but guided in its forward movement by a cam so as to feed the stock gripped in the feed fingers 10 up to the stock stop 20. Thereafter, the chucking slide serves to close the chuck so as to grip the stock, after which the feed slide is retracted carrying with it the feed tube 9 and causing the feed fingers to slide back on the bar stock. Such retraction of the feed slide may be during the indexing movement of the spindle carrier. Each spindle goes through the same cycle of operations so long as the stock in each spindle is of a length sufficient to assure a complete piece part being made from the projected end of the bar of stock. Our invention relates particularly to means for stopping a machine, or at least the feed functions thereof, when the bar stock has been reduced to a point where the stock would not be properly fed up to the stock stop upon the next feed movement of the feed tube.

In the preferred form illustrated, we take advantage of the fact that, while the feed fingers are in frictional gripping engagement with the bar of stock, considerable force is required to move the feed tube longitudinally but, when the butt end of the bar has been sufficiently reduced in length, the feed fingers on the draw-back of the feed tube slip from the rear end of the butt and thereafter the feed tube may be moved longitudinally with relative ease. In a machine equipped with a guard ring 14 and a feed shoe 17 where the spools are delivered from the shoe 17 to the guard ring and from the guard ring to the feed shoe, the feed tubes are all held against any substantial longitudinal movement after the feed fingers have been disengaged from the butt end of the stock.

In the form of the invention illustrated, the bracket 15 carries a base plate 25 rigidly secured thereto as by means of bolts 26—26. A lever 27 is pivotally mounted at 28 on the base plate 25 and the forward end is provided with a curved shoe face 29 which is at all times in position to be engaged by the rear flange 12 of the feed spool of each feed tube while the latter is in either normal or abnormal longitudinal position, for a purpose to be later described. The lever 27 is normally held in its raised position, as indicated in Fig. 2, by a latch which, in the form illustrated, comprises a latch lever 30 pivotally mounted at 31 on the lever 27. The latch lever 30 has an opening 32 and an abutment shoulder or surface 33 which when in the position shown in Fig. 2 engages a fixed abutment preferably in the form of a slabbed off pin 34 secured to the base plate 25 and projecting into the opening 32. It will be seen that, with the latch lever 30 and the lever 27 in the positions indicated in Fig. 2, the lever 27 will be held up but, if the latch lever 30 be raised so as to disengage the abutment shoulder 33 from the abutment 34, the lever 27 will be permitted to drop and will fall until the edge 35 of the opening 32 comes into engagement with the slabbed off side of the pin 34 as indicated in Fig. 1. As heretofore stated, the shoe face 29 of the lever 27 is always positioned so as to be engaged by the flange 12 of the feed spool when such flange is indexed past the lever 27. Therefore, each time a feed tube is indexed past the lever 27, the latter will be raised and the latch lever will again fall into its position shown in Fig. 2 so as to hold the lever 27 in raised position.

The latch lever 30 is so positioned relatively to the flange 12 that while the feed fingers frictionally grip the bar of stock the flange 12 will be forward of the lever 30 and will not engage the same. However, when the feed fingers have become disengaged from the butt end of the bar and the feed spool moved to an abnormal position rearwardly by means to be described, the latch lever 30 will be engaged and raised so as to release the lever 27 and permit the same to fall to the position shown in Fig. 1, as heretofore described. In order to move the feed tube which has been disengaged from the short butt end of a bar of stock, we preferably provide within the length of the guard ring 14 or forming a continuation thereof, means such as a bowed plate spring 36 held on a pin 37 and bent about a second pin 38, both of these pins being held on the base plate 25 so that the normally bowed plate spring 36 will pass through the spool of each feed tube as it indexes from the last work station to the feed station. If the plate spring 36 is positioned in and forms a part of the guard ring 14, the latter is cut away to such an extent as to permit the feed tube to be moved rearwardly from the full line position of Fig. 3 to the dotted line position; that is, about to the extent to which the spool is moved to the rear in Fig. 6, namely, sufficient to cause the rear flange 12 of the feed spool to engage beneath the latch lever 30 and trip the same. The spring 36 is sufficiently weak so that with the feed fingers gripping the bar of stock, the spring cannot move the feed tube rearwardly and is merely flexed as each feed spool is indexed past. However, when the bar of stock has been exhausted and the feed tube is consequently not restrained by the bar of stock, the spring 36 is of sufficient strength to move the tube rearwardly to the extent to which the spool is moved to the rear in Fig. 6 and upon the indexing movement the latch lever 30 is tripped and permits the lever 27 to drop. Thus, when the spindle in which the bar of stock has been exhausted, except for the piece part at that time projecting, passes from the work station 7 to the feed station the latch mechanism is tripped. Tripping of the latch mechanism in the preferred form sets a machine throw-out mechanism which will be described.

In the form shown, the lever 27 carries an adjustable screw 39 which is adapted to engage a push button switch 40 and normally hold the same closed when the latch or trigger mechanism is set as in Fig. 2. The switch is wired to motor means such as a solenoid 41 and, so long as the parts are in the normal position shown in Fig. 2, the solenoid remains energized. However, when the bar of stock in one spindle has been exhausted, the latch or trigger mechanism is tripped or sprung so as to withdraw the adjustable contact pin 39 and permit the switch 40 to open and thus deenergize the solenoid 41. Deenergization of the solenoid sets delayed control mechanism for stopping the machine.

Figure 5:
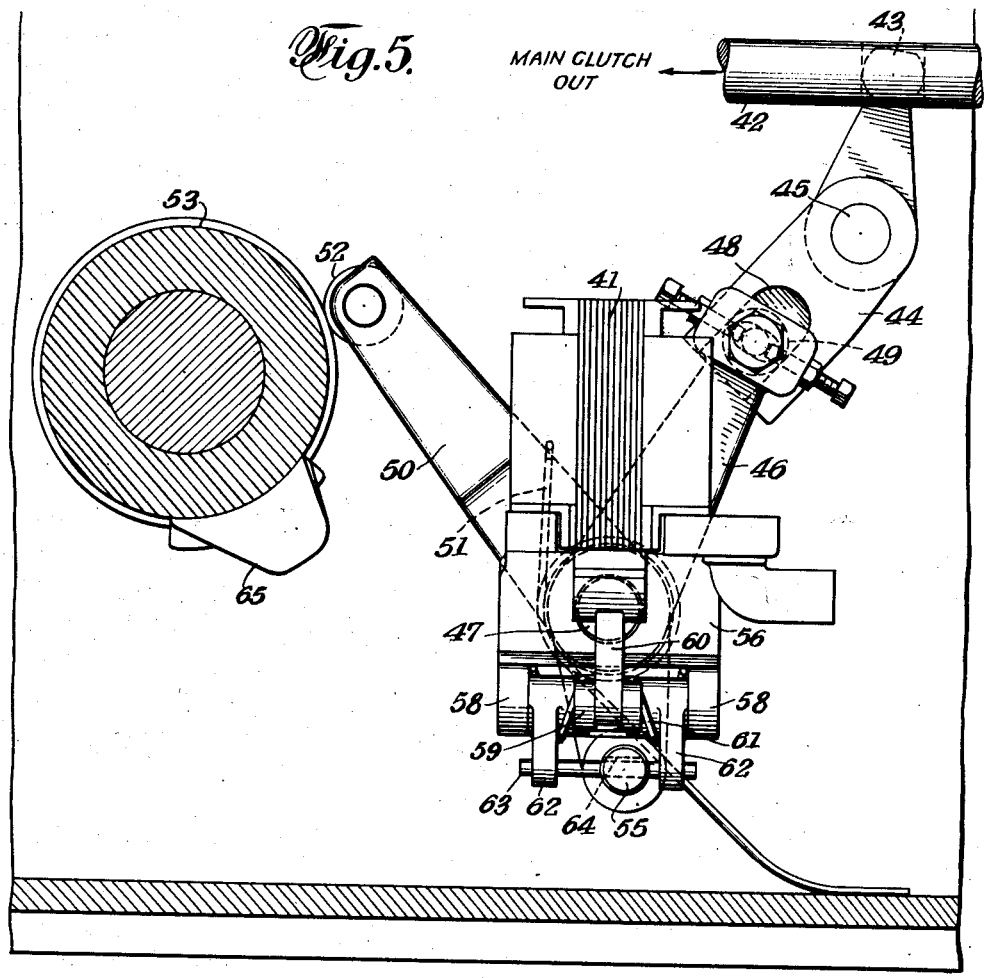
Fig. 5 is an end view as viewed from the right of the lower portion of Fig. 1, illustrating the delayed action mechanism for stopping the machine.

In the form illustrated, the feed works of the machine, or, if it is desired to stop the entire machine, the control member for the machine, is actuated by the bar 42. When the latter is moved toward the left (Fig. 5), the feed works are thrown out or the machine stopped and, conversely, when the bar 42 is moved toward the right, the machine is started or the feed works thrown in. The bar 42 may be provided with a recess for receiving the end 43 of a lever 44, pivoted at 45 on the machine frame. The lever 44 is connected to a lever 46 pivoted on the pin 47. The connection may be in the form of a slot 48 in the lever 44 and a roller 49 carried by the end of the lever 46. Thus, when the lever 46 is rocked in a clockwise direction as viewed in Fig. 5, it will rock the lever 44 and actuate the bar 42 for stopping the machine or throwing out the feed works. The lever 46 is arranged to be cam actuated in timed relation with the feed functions of the machine. As illustrated, a second lever 50 is pivoted on the pin 47 and urged in a counterclockwise direction as indicated in Fig. 5 by means of a spring 51. The lever 50 carries a cam roll 52 positioned to ride on a surface of a cam drum 53 on the main cam shaft of the machine or on some cam shaft timed therewith. The lever 50, as in the tail portion thereof, is provided with a tapered opening 54 and the lever 46 is provided with a part slidably carrying a pin 55 tapered on the end to engage within the opening 54. Carried on the fixed pivot pin 47 is a bracket 56 which, in the form shown, supports the solenoid and, in addition, carries a pivot pin 57 extending between ears 58—58 thereon. A lever 59 is fixedly mounted on the pivot pin 57 and is connected as by means of a link 60 to the armature of the solenoid. The lever 59 is urged so as to assist the weight of the armature by means of a spring 61, as will be understood. The pivot pin 57 may carry a pair of arms 62 fixedly secured thereto and which carry a pin 63. The pin 63 fits and at times slides within a slot 64 in the pin 55.

When the latch mechanism 27—30 has been tripped, the solenoid is deenergized as explained and the armature drops assisted by the spring 61. Such dropping of the armature projects the pin 55 into the registering opening 54 of the lever 50, thus locking levers 46—50 together. The machine continues its indexing movement, and when the piece part is to be severed in the loading station the feed functions of the machine continue until such piece part is severed, and until the chuck has been opened and the feed slide moved forwardly so as to force out as far as possible the butt end of stock in the feed station. Just at that time, the cam 65 on the cam drum 53 will engage the roll 52 and rock the lever 50 which now being coupled by means of the pin 55 to the lever 46 will rock the latter and through the lever 44 the feed works will be thrown out and the machine will therefore stop with the chuck open and the feed slide moved forward so as to project the butt end of the stock where it may be readily grasped. Thereafter, a new bar of stock is inserted and bumped through the feed tube and up against the stock stop, after which the machine is again ready to be started. Since the machine was stopped with the cam roll 52 on the high part of the cam 65, it will be obvious that the bar 42 cannot be actuated as by means of the usual clutch handle 66 of the machine to again start the same. Therefore, we have inserted in parallel with the switch 40 a second switch 67 (Fig. 1) so that by closing the switch 67 the solenoid 41 is again energized so as to retract the pin 55, after which the lever 46 will be disconnected from the lever 50 and the handle 66 may be actuated so as to again start the machine. When the lever 66 has been shifted, of course the switch 67 may be released, and even though the solenoid armature should again fall nothing would happen since the levers 46—50 would be positioned to put the pin 55 and opening 54 out of registry. The starting of the machine, as described, will serve to close the chuck so as to grip the new bar of stock, and retract the feed slide, and then the machine will be indexed. Upon the next indexing movement the feed tube of the spindle 7 will engage beneath the shoe surface 29 of the levers 27 and raise the same, which raising serves to permit the latch lever 30 to fall into its latching position as indicated in Fig. 2 and will cause the push button switch 40 to be closed so as to again energize the solenoid 41 and hold the pin 55 in retracted position until such time as a bar of stock becomes exhausted in another spindle, at which time the latch lever 30 will again be tripped and the machine stopped as heretofore described.

It will be seen that by means of our invention the operator need pay no attention to the machine until it is automatically stopped. When it is stopped, the bar of stock in the feed station will be exhausted, the chuck will be opened, and the feed slide will have fed the butt end of the stock forward so that it may easily be grasped and removed and a new bar of stock inserted from the rear. No hand cranking of the machine to bring parts to the desired position is required and considerable time is thus saved in stocking each spindle and considerable bar stock is saved by not removing the same until it is exhausted. Furthermore, there is no danger of feeding short. The starting of the machine after it has been automatically stopped is a simple matter involving merely the pressing of the switch button 67 and throwing in of the usual starting lever 66. The automatic control mechanism as heretofore described will be automatically reset upon the first indexing movement of the machine after starting. If the stock in the spindle which in indexing causes the latch mechanism to be reset is itself exhausted, the feed tube of that spindle will immediately thereafter trip the latch lever and the machine will again be stopped. In fact, if bars of equal length be stocked in a machine when starting it up, all of the bars will become exhausted one after the other and the machine will automatically be stopped upon each indexing movement until completely restocked.

As indicated, upon a run out of stock the entire machine may be stopped or only so much thereof as controls the feed works may be stopped. Unless otherwise stated, therefore, the substance of the term "stopping the machine" as used in the claims means stopping the feed functions of the machine, whether or not in so doing the entire machine is stopped.

While the invention has been described in considerable detail and a preferred form shown as applied to a bar machine, it is to be observed that various changes and modifications may be made and the principles of the invention are applicable to machines of other types, all as contemplated within the scope of the appended claims.

We claim:

1. In a bar machine, an indexible spindle carrier having a plurality of spindles indexible therewith, a feed tube for each spindle for feeding bar stock therein, means for moving said feed tube to an abnormal position when disengaged from the butt end of a bar of stock, control means actuable by said feed tube in abnormal position upon an indexing movement thereof, and delayed action means controlled by said control means for stopping said bar machine at a predetermined point in the cycle.

2. In a bar machine, an indexible spindle carrier having a plurality of spindles for bar stock, means positioned to stop said machine at a predetermined point in the cycle, control means actuable upon an indexing movement of said spindle carrier when the bar of stock has been exhausted in any spindle, said machine stopping means being controlled by said control means.

3. In a bar machine, an indexible spindle carrier having a plurality of spindles, cam means acting in timed relation with the feed functions of said machine and adapted at times to stop said machine, means movable to an abnormal position when the bar of stock in a spindle has been reduced to less than a predetermined length, and control means actuable upon an indexing movement of said spindle carrier by said means in abnormal position for rendering said machine stopping means operative to stop said machine at a predetermined point in a cycle.

4. In a bar machine, an indexible spindle carrier having a plurality of spindles, control means actuable during an indexing movement of said spindle carrier upon a run-out of stock in a spindle, and delayed action means controlled by said control means for subsequently stopping said machine after completion of said indexing movement of said spindle carrier.

5. In a bar machine, an indexible spindle carrier having a plurality of spindles, a feed tube for each spindle for feeding a bar of stock therein, said feed tube being normally frictionally held on said bar of stock, means for moving the feed tube of a spindle to an abnormal position when said feed tube has been withdrawn from the butt end of a bar of stock, control means positioned to be engaged by said feed tube when in abnormal position for actuating said control means, and delayed action means controlled by said control means for stopping said machine after completion of the indexing movement thereof, for the purpose described.

6. In a machine of the character indicated, an indexible spindle carrier having a plurality of spindles, a feed tube for each spindle for feeding stock therein, means for moving said feed tube to an abnormal position when the latter has been withdrawn from the butt end of a bar of stock, trigger mechanism positioned to be actuated by said feed tube when in abnormal position upon an indexing movement for controlling the control mechanism, and delayed action means controlled by said control means for stopping said machine after completion of said indexing movement.

7. In the combination defined in claim 6, and means for automatically resetting said trigger mechanism upon the next indexing movement of said spindle carrier.

8. In the combination defined in claim 6, and means engageable by the next succeeding feed tube whether in normal or abnormal position for resetting said trigger mechanism.

9. In a bar machine, an indexible spindle carrier having a plurality of spindles, control means actuable upon an indexing movement of said carrier when the bar of stock has been reduced to less than a predetermined length, cam means for stopping said machine at a predetermined point in the cycle, and means controlled by said control means for rendering said cam means operative to stop said machine as aforesaid.

10. In a bar machine, an indexible spindle carrier having a plurality of spindles, a stock feed mechanism for each spindle, machine control means including settable trigger mechanism for controlling the operation of said machine, means for moving a part of said stock feed mechanism upon a run-out of stock, said stock feed mechanism being positioned when moved as aforesaid to trip said settable control mechanism upon an indexing movement of said spindle carrier to stop said machine, said trigger mechanism being positioned to be engaged and reset by an indexing part upon the next indexing movement of said spindle carrier.

11. In a machine of the character indicated, a machine control member, a lever coacting therewith, a second lever, said levers being normally independent of each other, a cam for actuating said second lever at a predetermined point in the cycle of the machine, and control mechanism for coupling said levers together upon an abnormal functioning of said machine, whereby said cam actuated lever will actuate said first lever to stop said machine upon said abnormal functioning.

12. In a machine of the character indicated, a machine control member, a lever coacting therewith and actuable to move said control member to stop the operation of the machine, a second lever, a cam for actuating said second lever at a predetermined point in each cycle of the machine, said levers being normally independent of each other, and automatically actuated means for coupling said levers together, whereby said cam actuated lever will actuate said first mentioned lever to actuate said machine control member for stopping said machine as aforesaid.

13. In a bar machine, an indexible spindle carrier having a plurality of spindles, a feed tube for each spindle, a guard ring engaging the feed spool of each feed tube for holding the latter in predetermined longitudinal position, said guard ring being engageable with all of the feed tubes except the one in feeding station, resilient means for urging each feed tube after leaving said guard ring upon an indexing movement of said spindle carrier, said resilient means being too weak to move a feed tube when frictionally engaged with a bar of stock but being sufficiently strong to move said feed tube to an abnormal position when disengaged from the butt end of a bar of stock, a trigger mechanism, a part being positioned in the path of movement of a feed tube when moved to abnormal position as aforesaid upon an indexing movement of said spindle carrier whereby said trigger mechanism will be sprung, and control means controlled by said trigger mechanism for stopping said machine upon completion of said indexing movement.

14. In the combination defined in claim 13, said trigger mechanism including a part in the path of movement of a feed tube when in normal or abnormal position for resetting said trigger mechanism upon the next indexing movement of said spindle carrier.

15. In a machine of the character indicated, an indexible spindle carrier having a plurality of spindles, a feed tube for each spindle, a trigger mechanism positioned adjacent to the normal path of movement of said feed tubes upon indexing movements thereof, means for moving a feed tube to abnormal position upon disengagement thereof from the butt end of a bar of stock and into position to engage and spring said trigger mechanism, and control means controlled by the position of said trigger mechanism for stopping said machine upon the completion of said indexing movement of said spindle carrier.

16. In the combination defined in claim 15, said control means including an electrical contact device.

17. In the combination defined in claim 15, said control means including an electric contact device and motor controlled thereby.

18. In a bar machine, an indexible spindle carrier having a plurality of spindles, a feed tube in each spindle and having a spool thereon, a guard ring engageable in and holding each said spool when in all stations except the feeding station in normal position, means for urging each feed spool upon disengagement from said guard ring toward an abnormal position, said means being sufficiently strong to move the feed spool to abnormal position when said feed tube is disengaged from the butt end of a bar of stock, a latch trigger mechanism positioned in the path of and engageable by a part of said feed tube when moved to said abnormal position, an electric switch controlled by said latch trigger mechanism, a solenoid connected to said switch and controlled thereby, and means controlled by said solenoid for stopping the machine upon the completion of the indexing movement of said spindle carrier referred to.

19. In a machine of the character indicated, a feed clutch, a member to coact therewith for throwing said clutch, a second member, means for actuating said second member at a predetermined point in the cycle of the machine, and means including electric circuit control mechanism for coupling said members together only upon an abnormal functioning of said machine whereby said second member will actuate said first member to throw said feed clutch upon said abnormal functioning.

20. In a machine of the character indicated, an indexible spindle carrier having a plurality of spindles, means including control means actuable upon an indexing movement of said spindle carrier for stopping said machine at the end of said indexing movement, and means for resetting said control means upon the next indexing movement of said spindle carrier.

21. In a machine of the character indicated, an indexible spindle carrier having a plurality of spindles, a trigger mechanism operable upon an indexing movement of said spindle carrier when a spindle carrying an exhausted bar of stock approaches a feed station, delayed action means controlled by said trigger mechanism for stopping said machine at the end of said indexing movement of said spindle carrier, and means for automatically resetting said trigger mechanism upon the next indexing movement of said spindle carrier.

22. In a machine of the character indicated, an indexible spindle carrier, a plurality of spindles carried thereby, a feed clutch, means acting at a predetermined point in each cycle of said machine for throwing said clutch upon a run out of stock in one of said spindles, electrical means for rendering said clutch throwing means inoperative during normal functioning of said machine, and means operable upon a run out of stock in one of said spindles for breaking the circuit to said electrical means whereby said clutch throwing means becomes operative to throw said clutch.

23. In a machine of the character indicated, an indexible spindle carrier, a plurality of spindles carried thereby and each indexible successively to feeding station, a feed tube for each spindle, means for freeing the feed tube from the butt end of an exhausted bar of stock before the spindle carrying such exhausted bar of stock has indexed from feed station around again to feed station, and means under control of said freed feed tube for actuating means to subsequently stop said machine when said spindle carrying said freed tube again reaches feeding station.

24. In a machine of the character indicated, an indexible spindle carrier, a plurality of spindles carried thereby, clutch throw out means, electrical means including a normally closed circuit means arranged to render said clutch throw out means inoperative, and means actuated upon a run out of stock in one of said spindles for breaking the normally closed circuit to said electrical means to render said clutch throw out means operative to subsequently throw out said clutch.

25. In a machine of the character indicated, an indexible spindle carrier having a plurality of spindles, control means actuable upon an indexing movement of said spindle carrier, and means under the control of said control means for stopping said machine.

26. In a machine of the character indicated, an indexible spindle carrier having a plurality of spindles, means actuable upon an indexible movement of said spindle carrier upon a run out of stock in a spindle, and machine means controlled by said first mentioned control means.

27. In a machine of the character indicated, an indexible spindle carrier having a plurality of spindles, a feed tube for each spindle, means for moving an actuating part to abnormal position after disengagement of a feed tube from the end of a stock butt, a control member operable by said actuating part when in abnormal position and upon an indexing movement of said spindle carrier, and means controlled by said control member for stopping the feed functions of said machine.

28. In a machine of the character indicated, an indexible spindle carrier having a plurality of spindles, a feed tube for each spindle, means for moving an actuating part to abnormal position after disengagement of a feed tube from the end of a stock butt, electric switch means operable by said actuating part when in abnormal position and upon an indexing movement of said spindle carrier, and means controlled by said electric switch means for stopping the feed functions of said machine.

29. In a machine of the character indicated, an indexible spindle carrier having a plurality of spindles, a feed tube for each spindle, means for moving an actuating part to abnormal rearward position after disengagement of a feed tube from the end of a stock butt, means for stopping the feed functions of said machine, and electric switch means under control of said actuating part in abnormal rearward position for controlling said means for stopping said machine.

30. In a machine of the character indicated, an indexible spindle carrier having a plurality of spindles, a feed tube for each spindle, means for moving an actuating part to abnormal rearward position after disengagement of a feed tube from the end of a stock butt, and means including electric switch means under control of said actuating part in abnormal rearward position for stopping the feed functions of said machine.

31. In a bar machine, an indexible carrier having a plurality of rotatable spindles, means for feeding bar stock through said spindles, and means actuable upon an indexing movement of said spindle carrier and controlled by the longitudinal position of a bar of stock in one of said spindles, for controlling the feed functions of said machine.

DONALD H. MONTGOMERY.
WILLIAM B. RETZ.